Patented Jan. 19, 1932

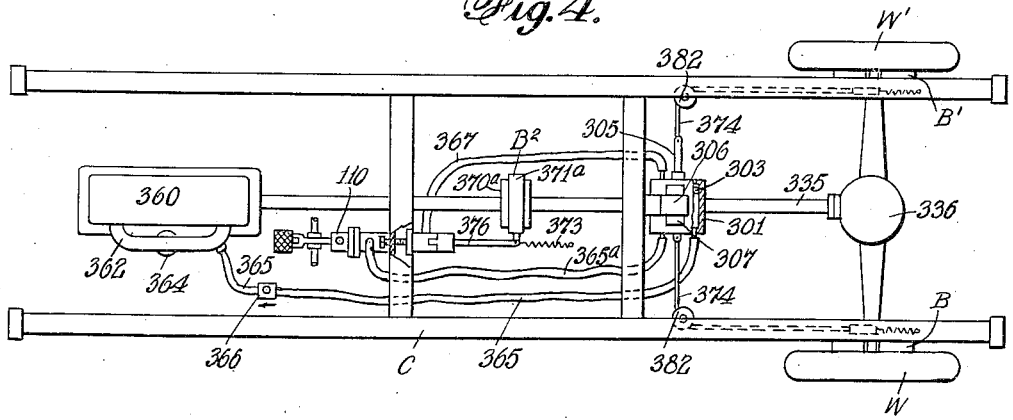
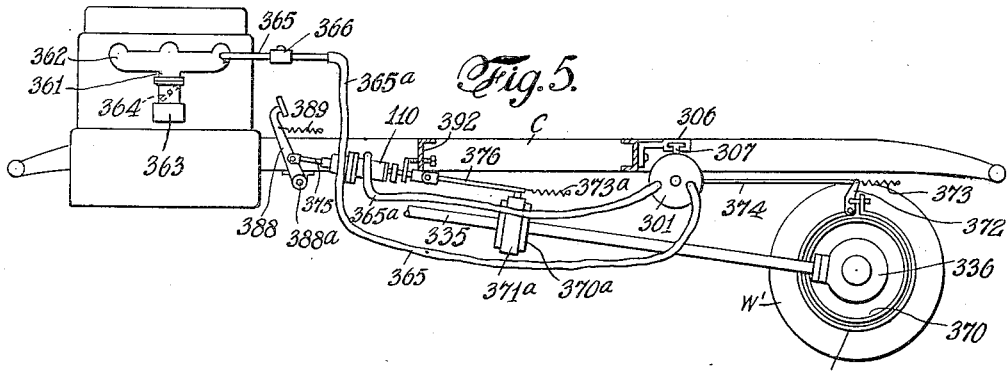
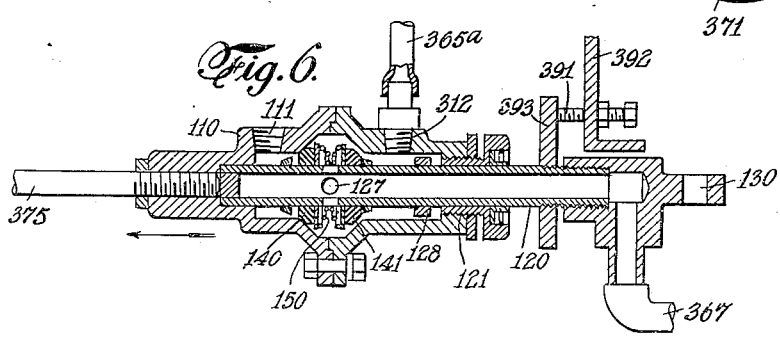

1,841,708

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Original application filed December 12, 1927, Serial No. 239,444. Divided and this application filed April 16, 1929. Serial No. 355,618.

Our invention consists in the novel features hereinafter described, reference being had to the accompanying drawings which show two embodiments of the same selected by us for purposes of illustration, and the said invention is fully disclosed in the following description and claims.

The object of our invention is to provide a pair of brake mechanisms for a pair of wheels of an automotive vehicle located opposite to each other transversely of the vehicle with a power actuator comprising a cylinder and piston for operating them by power obtained by the differential of higher and lower fluid pressures, most conveniently atmospheric pressure operating against a partial vacuum or rarefication obtained for example from the throttle controlled suction passage of an internal combustion engine which drives the vehicle (or other source of suction), the cylinder and the piston being both movable with respect to each other and with respect to the chassis of the vehicle, the piston being connected to one brake mechanism and the cylinder to the other so that the power of the actuator will always be applied equally to the brake mechanisms for both wheels without regard to the individual adjustments of the brake mechanisms or wear of brake linings, the stroke of the piston in the cylinder being sufficiently long to compensate for considerable wear of the brake linings and obviating frequent adjustments in the connections thereto. An operator operated part is provided for controlling the valve mechanism for the actuator, and in our present invention the operator operated part is connected by means providing lost motion with other brake mechanisms, preferably brake mechanisms for the same pair of wheels which are retarded by the power actuated brake mechanisms. In the embodiments of our invention herein shown, the power actuated brake mechanisms are applied to the rear wheels of the vehicle, and the operator operated part is connected with brake mechanism on the propeller shaft which drives the rear wheels, so that the operator may apply his physical force equally to said wheels in addition to the power applied by the power actuator to the brake mechanisms therefor which it operates, and the operator may also apply the brake mechanisms connected with the operator operated part independently of the actuator.

Our invention permits of the use of smaller and cheaper actuators for any given power required, and less air is therefore withdrawn into the suction source with less danger of interfering with the operation of the engine or of stalling it if idling, where the suction is obtained from the suction passage of the engine, and equalization in the application of the force, both of the actuator and of the operator, is secured.

This application is a division of our former application filed December 12, 1927, and given Serial No. 239,444.

Referring to the accompanying drawings,

Fig. 4 is a view similar to Fig. 1 showing a slight modification.

Fig. 5 is a view similar to Fig. 2 of the apparatus shown in Fig. 4.

Fig. 6 is a view similar to Fig. 3 of the valve mechanism shown in Figs. 4 and 5.

Figure 1:
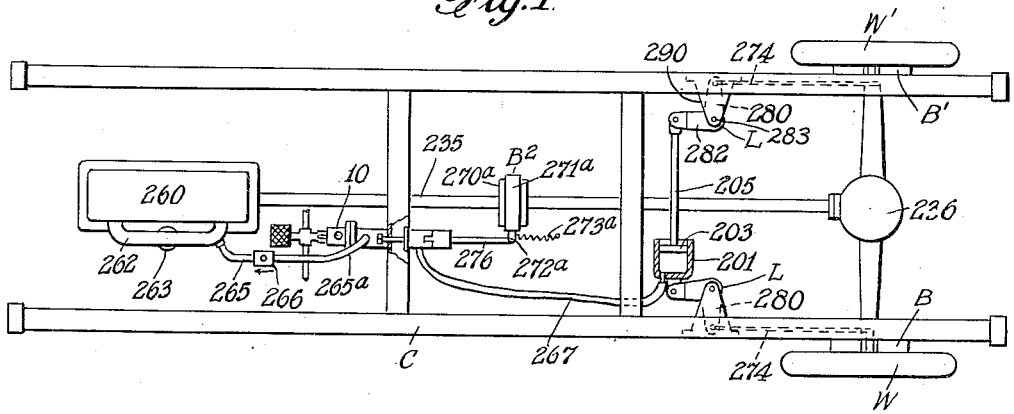
Fig. 1 is a diagrammatic plan view of a portion of an automotive vehicle showing our invention embodied therein.
Figure 2:
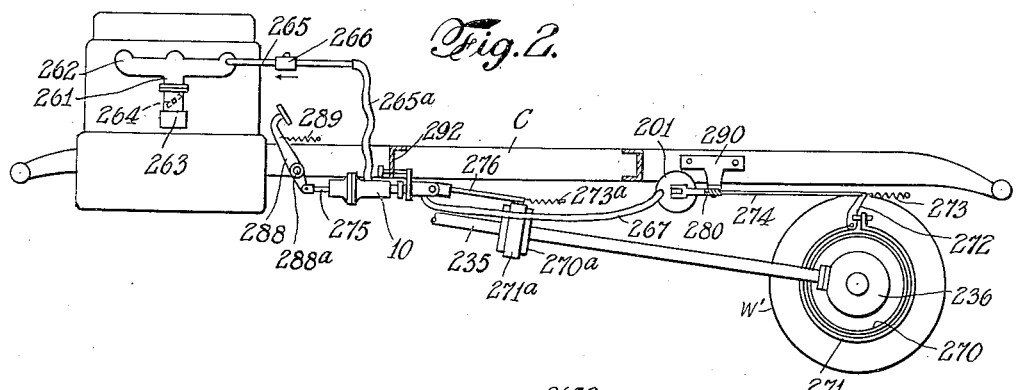
Fig. 2 is a diagrammatic sectional elevation of Fig. 1.
Figure 3:
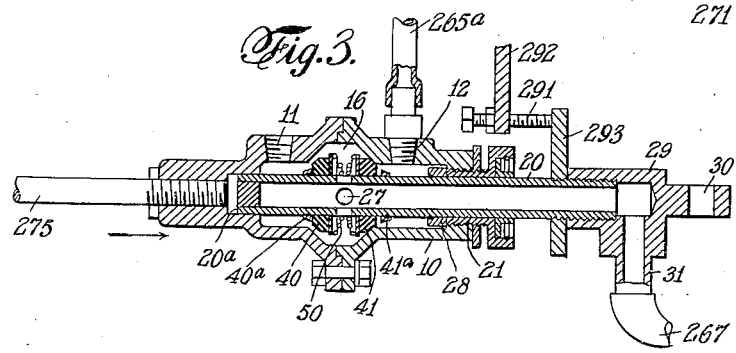
Fig. 3 is a detail sectional view of one form of controlling valve mechanism which may be employed for the actuator.

In the embodiment of our invention illustrated in Figs. 1, 2 and 3, C represents the chassis of an automotive vehicle, of which, W, W¹, are a pair of oppositely disposed wheels, as the rear or driving wheels, driven in any usual or preferred manner by an internal combustion engine, 260, provided with the usual suction passage 261, of which the intake manifold, 262, is a part, it being understood that the suction passage is connected as usual with the carburetor indicated at 263, and with the usual throttle valve indicated at 264, between the carburetor and the engine cylinders. B, B¹, represent the independent brake mechanisms for wheels, W, W¹, which may be of any desired type and are shown in this instance for example as indicated in Fig. 2, as comprising each a brake drum, 270, brake band, 271, and brake applying lever, 272, with its retracting spring, 273. L, L, represents a pair of two armed levers, the arms, 280 and 282, of which are set at any desired angle to each other and united at the pivotal point, 283, where they are pivoted to brackets, 290, secured to the chassis adjacent to opposite sides of the vehicle. In this instance each lever arm, 280, is connected by a link, 274, with the lever, 272, of the adjacent brake mechanisms. Between the arms 282, of the respective levers, L, L, we interpose a power actuator comprising a cylinder, 201, and a piston, 203, each of which is connected to one of said arms, 282. In this instance the cylinder, 201, is shown pivotally connected to and supported by one arm, 282, the piston being provided with a piston rod, 205, pivotally connected to the other arm, 282. It will be understood that both the cylinder and the piston are movable with the respective arms, 282, to which they are connected. The actuator is provided with suitable controlling valve mechanism, and in this instance we have shown a form of valve mechanism covered by our United States Letters Patent No. 1,731,041, dated Oct. 8th, 1929. Briefly stated, this valve mechanism comprises a valve casing, 10, provided with a central valve chamber, 16, in which are located two oppositely disposed valves, 40 and 41, the casing being provided with apertures, 11 and 12, on opposite sides of the chamber, and the chamber being connected with the closed end of the cylinder through a hollow valve actuating sleeve, 20, movable with and with respect to the valve casing and valves, and having an aperture, 27, communicating with the chamber, 16, between the valves, and a fitting, 29, outside of the casing having an ear, 30, and a connection, 31, to which a flexible tubular connection with the cylinder can be connected. The valves are normally pressed toward their seats at opposite ends of chamber, 16, by yielding means, 50, and sealingly engage the sleeve, 20, which is provided with collars, 40$^a$ and 41$^a$, so located as to effect the opening of one valve after permitting the other to close, by a movement of the valve sleeve in either direction with respect to the valve casing, and permitting both valves to be closed at the same time. The lost motion between the sleeve, 20, and the valve casing is limited, in one direction by a collar, 28, on the sleeve which engages the adjusting sleeve, 21, in the end of the casing, and in the other direction by the engagement of the end, 20$^a$, of the sleeve with the valve casing.

In this instance we have shown an operator operated part consisting of a pedal lever, 288, pivoted at 288$^a$, to the chassis, and provided with a retracting spring, 289, said lever being connected below its pivot by a link, 275, to the valve casing, 10, the valve actuating sleeve, 20, being connected by link, 276, with brake mechanism other than the brake mechanisms with which the power actuator is connected, thus connecting the operator operated part with said other brake mechanism by means providing lost motion.

In this construction the rear or non-steering wheels of the vehicle, indicated at W, W$^1$, are shown as driven by a propeller shaft, 235, through the usual differential gearing, the housing for which is indicated at 236. The propeller shaft is provided with a brake mechanism indicated at B$^2$, and comprises in this instance the usual brake drum, 270$^a$, brake band 271$^a$, and brake applying lever, 272$^a$, of usual or well known construction. The brake mechanism for the propeller shaft may, however, be of any desired type. Obviously this propeller shaft brake mechanism will apply braking force to both of the rear wheels through the differential gearing in a well known manner, and the differential gearing in this instance also acts as an equalizing device to distribute the braking force of the propeller shaft brake mechanism between the rear wheels, which in this instance are also provided with the independent brake mechanisms, B, B$^1$, as previously described. In this instance, therefore, the link rod, 276, from the valve actuating part, 20 of the controlling valve mechanism for the actuator is connected, as shown, to the lever, 272, of the propeller shaft brake mechanism.

We also provide an adjustable stop, 291, consisting in this instance of a set screw carried by a bracket, 292, secured to the chassis for engaging a collar, 293, on the valve actuating sleeve, 20, to determine the position of the brakes and valve mechanism in the released position.

In the installation illustrated in Figs. 1, 2 and 3, the aperture, 12, of the valve casing is connected with a source of suction, being in this instance connected by a suction pipe, 265, a portion, 265$^a$, of which is flexible, with the suction passage of the engine between the throttle valve and the engine cylinders, the connection being conveniently made with the intake manifold, 262. The suction pipe is provided with a check valve, 266, opening in a direction toward the manifold, as indicated by the small arrows adjacent thereto in Figs. 1 and 2. The aperture, 11, of the valve casing is in communication with a source of higher fluid pressure, which in this instance is the atmosphere. In the released position of the valve mechanism which is illustrated in Fig. 3, the valve, 40, which is the higher pressure valve, is held in open position by the retracting spring, 289, of the foot lever, the collar, 28, being in engagement with the adjusting sleeve, 21, and the collar, 293, on the valve sleeve, 20 being in engagement with the stop, 291. The valve actuating sleeve, 20, is connected by a pipe, 267, which is also flexible, with the closed end of the cylinder, 201, and the valve, 40, being in open position, the interior of the cylinder is in communication with the atmosphere. As the opposite end of the cylinder is opened, both faces of the piston and the opposite faces of the closed end of the cylinder are subjected to atmospheric pressure, and the pressure in the actuator is equalized when the parts are in released position.

To effect an application of the brake mechanisms, B, B$^1$, by power, the operator will depress the foot lever, thereby moving the valve casing, 10, rearwardly in the direction of the arrow in Fig. 3, with respect to the valve actuating sleeve, closing the air inlet valve, 40, and thereafter opening the suction valve, 41, so as to connect the cylinder with the suction pipe, 265, leading to the intake manifold. Assuming that the engine is running and that the throttle valve is closed or partly closed, the air will be exhausted from the cylinder, 1, and the atmospheric pressure on the outer face of the piston and the cylinder head will effect the movement of the cylinder and piston toward each other, thereby applying the brake mechanisms, B, B$^1$, simultaneously and equalizing the amount of the pressure exerted by said power actuator between them, regardless of the adjustment of the brake band or the wear of the braking surfaces.

The stroke of the piston in the cylinder is made sufficiently long to insure the application of both brake mechanisms to their maximum extent by power regardless of wear of the braking surfaces, without bringing the piston into contact with the head of the cylinder. It will, therefore, be unnecessary to adjust the brake mechanisms or to give them any special attention, except to replace the brake linings when sufficiently worn to make this necessary. When the brakes, B, B$^1$, have been fully applied by the power actuator, the operator may, however, take up the lost motion provided in the connections between the operator operated part and the propeller shaft brake mechanism, B$^2$, (i. e., the lost motion provided between valve casing, 10, and valve actuating sleeve, 20), and the physical force of the operator may be used to apply the brake mechanisms, B$^2$, which in this instance supplies additional braking force for the rear wheels, W, W$^1$, through the propeller shaft brake mechanism in addition to the power exerted by the actuator on the independently operable brake mechanisms, B, B$^1$, for said wheels, W, W$^1$, and in case of failure of power the physical force of the operator may be used to supply braking force, in this instance for the rear wheels, W, W$^1$, by operating the propeller shaft brake mechanism, B$^2$, without operating the brake mechanisms connected with the power actuator.

According to our invention in which the cylinder and piston are both movable and are each connected with one of the brake mechanisms to be operated, a small, cheap and light power actuator can be employed. Our invention also provides an equalization of the power applied to both brake mechanisms and through them to the wheels when actuated by power or by the physical force of the operator, or both, thus obviating the necessity for individually adjusting said brake mechanisms to secure an equal application thereof, and by making the cylinder of sufficient length to provide for the maximum application of the brakes, regardless of the wear of the braking surfaces.

It will be understood that our invention is also applicable to installations in which the power actuator piston is exposed on both faces to the lower pressure fluid, such as is illustrated for example in Figs. 1 and 2 of our United States Letters Patent No. 1,731,041, dated Oct. 8th, 1929, and given Serial No. 94,412, hereinbefore referred to, and it will be also understood that the cylinder may be movably supported from and with respect to the chassis, and the cylinder and piston connected by cables passing around sheaves of pulleys mounted on the chassis instead of operating through levers as previously described. In Figs. 4, 5 and 6 we have shown a construction in which the parts corresponding to those shown in Figs. 1, 2 and 3 are given the same numerals with the addition of 100, and which illustrate the foregoing modification. In this instance the actuator cylinder, indicated at 301, is closed at both ends, the outer closed end of the cylinder forward of the piston being connected at all times with the suction passage of the engine by a suction pipe, 365, which extends directly to the suction passage. The valve mechanism will occupy the position shown in Fig. 6, when in released position, the aperture forward of the valve chamber being connected with the atmosphere, the aperture in rear of the valve chamber being connected by a pipe, 365$^a$, with the cylinder forward of the piston, while the hollow valve actuating sleeve is connected by the pipe, 367, with the cylinder in rear of the piston, thereby connecting the ends of the cylinder on opposite sides of the piston with each other and with the suction passage of the engine when the valve is in the released position shown in Fig. 6.

The cylinder, 301, and the piston therein are supported in this instance from the chassis of the vehicle by means permitting the cylinder and piston to move with respect to the chassis and with respect to each other. In this instance we have shown the chassis provided with a grooved guide, indicated at 306, to receive a slide bracket, 307, secured to the cylinder, 301, of the actuator. The rear or non-steering wheels, W, W¹, are shown as provided with the brake mechanism, B, B¹, constructed as hereinbefore described, the operating levers, 372, of said brake mechanisms being connected in this instance by cables, 374, 374, passing around sheaves, 382, mounted on the chassis, with the cylinder, 301, and with the piston rod, 305, of the piston, 303, respectively. In this instance for convenience of illustration, the link, 376, from the valve actuating sleeve is connected to the operating arm, 372, of propeller shaft brake mechanism, B², as in Fig. 1. The operation of the construction illustrated in Figs. 4, 5 and 6 will be the same as that previously described with reference to Figs. 1, 2 and 3, so far as the application of the brakes is concerned, but will be understood that as the portion of the cylinder forward of the piston is at all times connected with the suction passage of the engine, the piston will be exposed on both faces to suction, or in other words the lower fluid pressure, when in released or off position, and the forward movement of the pedal to apply the brake mechanisms, B, B¹, by power, will disconnect the two ends of the cylinder from each other and admit the higher pressure fluid or atmospheric air to the cylinder in rear of the piston, effecting a power stroke of the piston and cylinder which move toward each other, without admitting any appreciable quantity of air to the suction passage of the engine, while on the release of the pedal the valve mechanism will reconnect the portions of the cylinder on opposite faces of the piston with each other and with the suction passage of the engine, to effect an equalization of pressures within the cylinder and to withdraw the air previously admitted, and permit the brakes to relieve themselves and be returned to their released position with the piston and cylinder under the action of the retracting means for the brake mechanisms, B, B¹. The physical force of the operator may also be applied to the wheels, W, W¹, as before described, in this instance through the propeller brake mechanism as described with reference to Figs. 1, 2 and 3.

What we claim and desire to secure by Letters Patent is:—

1. In a brake system for automotive vehicles, the combination with a plurality of brake mechanisms for a pair of wheels disposed oppositely to each other transversely of the vehicle, of a power actuator comprising a cylinder and piston both movable with respect to each other and with respect to the vehicle, connections from the cylinder to brake mechanism for one of said wheels, connections from the piston to brake mechanism for other of said wheels, controlling valve mechanism for the actuator, means for establishing differential fluid pressures on opposite faces of said piston and said cylinder under the control of said valve mechanism, an operator operated part for said valve mechanism, and separate brake means operatively connected with said operator operated part to enable them to be applied by physical force.

2. In a brake system for automotive vehicles, the combination with a plurality of brake mechanisms for a pair of wheels disposed oppositely to each other transversely of the vehicle, of a power actuator comprising a cylinder and piston both movable with respect to each other and with respect to the vehicle, connections from the cylinder to brake mechanism for one of said wheels, connections from the piston to brake mechanism for other of said wheels, controlling valve mechanism for the actuator, means for establishing differential fluid pressures on opposite faces of said piston and said cylinder under the control of said valve mechanism, an operator operated part for said valve mechanism, separate brake mechanism for the vehicle, and connections therefrom to the operator operated part including a provision for sufficient lost motion to insure the operation of said valve mechanism.

3. In a brake system for automotive vehicles, the combination with a plurality of brake mechanisms for a pair of wheels disposed oppositely to each other transversely of the vehicle, of a power actuator comprising a cylinder and piston both movable with respect to each other and with respect to the vehicle, connections from the cylinder to brake mechanism for one of said wheels, connections from the piston to brake mechanism for other of said wheels, controlling valve mechanism for the actuator, means for establishing differential fluid pressures on opposite faces of said piston and said cylinder under the control of said valve mechanism, an operator operated part for said valve mechanism, separate braking means for applying the physical force of the operator to brake the aforementioned wheels of the vehicle and connections from said latter braking means to the operator operated part.

4. In a brake system for automotive vehicles, the combination with a plurality of brake mechanisms for a pair of wheels disposed oppositely to each other transversely of the vehicle, of a power actuator comprising a cylinder and piston both movable with respect to each other and with respect to the vehicle, connections from the cylinder to brake mechanism for one of said wheels, connections from the piston to brake mechanism for other of said wheels, controlling valve mechanism for the actuator, means for establishing differential fluid pressures on opposite faces of said piston and said cylinder under the control of said valve mechanism, an operator operated part for said valve mechanism, a separate brake mechanism for a propeller shaft for driving the aforementioned pair of wheels, and operative connections between said propeller shaft brake mechanism and the operator operated part.

5. In a brake system for automotive vehicles, the combination with a plurality of brake mechanisms for a pair of wheels disposed oppositely to each other transversely of the vehicle, of a power actuator comprising a cylinder and piston both movable with respect to each other and with respect to the vehicle, connections from the cylinder to brake mechanism for one of said wheels, connections from the piston to brake mechanism for other of said wheels, controlling valve mechanism for the actuator, means for establishing differential fluid pressures on opposite faces of said piston and said cylinder under the control of said valve mechanism, an operator operated part for said valve mechanism, and separate braking means for said pair of wheels, operatively connected with said operator operated part to permit of the operation of said separate braking means by the physical force of the operator.

6. In a brake system for automotive vehicles, the combination with a plurality of brake mechanisms for a pair of wheels disposed oppositely to each other transversely of the vehicle, of a power actuator comprising a cylinder and piston both movable with respect to each other and with respect to the vehicle, connections from the cylinder to brake mechanism for one of said wheels, connections from the piston to brake mechanism for other of said wheels, controlling valve mechanism for the actuator, means for establishing differential fluid pressures on opposite faces of said piston and said cylinder under the control of said valve mechanism, an operator operated part for said valve mechanism, separate braking means for said pair of wheels, and connections therefrom to the said operator operated part including a provision for sufficient lost motion to insure the operation of said valve mechanism.

7. In a brake system for automotive vehicles, the combination with a plurality of brake mechanisms for a pair of wheels on one of the axles of the vehicle, of a power actuator comprising a cylinder and piston both movable with respect to each other and with respect to the vehicle, connections from the cylinder to the brake mechanism for one of said wheels, connections from the piston to brake mechanism for the other of said wheels, controlling valve mechanism for the actuator, means for establishing differential fluid pressures on opposite faces of said piston and said cylinder under control of said valve mechanism, an operator operated part for said valve mechanism, a propeller shaft operatively connected with said wheels, brake mechanism on the propeller shaft, and connections between said brake mechanism and said operator operated part for enabling the operator to apply braking force to said wheels in addition to the power exerted by the actuator on the brake mechanisms connected therewith, or in case of failure of power.

8. In a brake system for automotive vehicles, the combination with a plurality of brake mechanisms for a pair of wheels on one of the axles of the vehicle, of a power actuator comprising a cylinder and piston both movable with respect to each other and with respect to the vehicle, connections from the cylinder to the brake mechanism for one of said wheels, connections from the piston to brake mechanism for the other of said wheels, controlling valve mechanism for the actuator, means for establishing differential fluid pressures on opposite faces of said piston and said cylinder under control of said valve mechanism, an operator operated part, operatively connected with the valve mechanism, a propeller shaft, a separate brake mechanism for said propeller shaft and connections from the latter brake mechanism to the operator operated part including a provision for lost motion, to enable the operator to apply braking force to said wheels in addition to the power exerted by the actuator on the first mentioned brake mechanisms connected therewith, or in case of failure of power.

In testimony whereof we affix our signatures.

CALEB S. BRAGG.
VICTOR W. KLIESRATH.